US005080989A

United States Patent [19]

Gruenbaum et al.

[11] Patent Number: 5,080,989

[45] Date of Patent: Jan. 14, 1992

[54] PHOTOCONDUCTIVE BLOCK COPOLYMERS

[75] Inventors: William T. Gruenbaum, Rochester; Henry V. Issacson, Webster; Jeanne E. Kaeding, Rochester, all of

[73] Assignee: Eastman Kodak Company, Rochester, N.Y.

[21] Appl. No.: 442,871

[22] Filed: Nov. 29, 1989

[51] Int. Cl.$^5$ .................. G03G 15/00; G03G 15/02
[52] U.S. Cl. ...................... 430/58; 430/56; 430/96
[58] Field of Search ............... 430/96, 56, 58

[56] References Cited

U.S. PATENT DOCUMENTS

| | | |
|---|---|---|
| 3,615,414 | 10/1971 | Light . |
| 3,660,083 | 5/1972 | Bloom et al. ............ 430/74 |
| 3,943,108 | 3/1976 | Teuscher ............ 430/80 X |
| 3,979,495 | 9/1976 | Erhardt . |
| 3,994,994 | 11/1976 | Stolka . |
| 4,006,454 | 1/1977 | Hashimoto ............ 430/81 |
| 4,014,728 | 3/1977 | Erhardt . |
| 4,115,116 | 9/1978 | Stolka et al. . |
| 4,297,455 | 10/1981 | Linder et al. ............ 525/439 |
| 4,299,897 | 11/1981 | Stolka et al. . |
| 4,304,829 | 12/1981 | Limburg et al. . |
| 4,444,861 | 4/1984 | Nogami et al. ............ 430/58 |
| 4,772,526 | 9/1988 | Kan et al. ............ 430/58 |
| 4,855,377 | 8/1989 | Yokota et al. ............ 528/25 |

FOREIGN PATENT DOCUMENTS 9230021 12/1984 Japan .
1241559 9/1989 Japan .

OTHER PUBLICATIONS

Serge Perez et al., Crystalline Features of . . . Macromolecules, 1987, 20, 68–77.

Primary Examiner—John Goodrow
Assistant Examiner—Steve Crossan
Attorney, Agent, or Firm—Dressler, Goldsmith, Shore, Sutker & Milnamow, Ltd.

[57] ABSTRACT

Photoconductive polycarbonate block copolymers are provided containing alternate polycarbonate blocks and photoconductor blocks. The photoconductive blocks are copolymers of polyesters and/or polycarbonates with reactive photonconductors which are preferably difunctional polyols and/or carboxylic acid derivatives. The block copolymers when blended with dyes form photoconductive layers in photoconductor elements which are photosensitive and highly resistant to solvent degradation. Dyes are aggregatable in such a block copolymer matrix.

14 Claims, No Drawings

PHOTOCONDUCTIVE BLOCK COPOLYMERS

FIELD OF THE INVENTION

This invention is in the field of photoconductive polymers containing polycarbonate blocks and the use of such block copolymers in reusable photoconductor elements.

BACKGROUND OF THE INVENTION

In electrophotography an image comprising an electrostatic field pattern, or latent image, which is usually of non-uniform strength, is formed on an insulative surface of an electrophotographic element. Such an element includes a photoconductive layer and an electrically conductive substrate. The electrostatic latent image is usually formed by imagewise radiation-induced dissipation of the strength of portions of an electrostatic field of uniform strength previously formed on the insulative surface. Typically, the electrostatic latent image is then developed into a toned image by contacting the latent image with an electrographic developer. If desired, the latent image can be transferred to another surface before development.

In latent image formation, the imagewise radiation-induced dissipation of the initially uniform electrostatic field is brought about by the creation of electron/hole pairs, which are generated by a material, often referred to as a photoconductive or charge-generation material, in the electrophotographic element in response to exposure to imagewise actinic radiation. Depending upon the polarity of the initially uniform electrostatic field and the types of materials included in the electrophotographic element, part of the charge that has been generated, i.e., either the holes or the electrons, migrate toward the charged insulative surface of the element in the exposed areas and thereby cause the imagewise dissipation of the initial field. What remains is a non-uniform field constituting the electrostatic latent image.

Several types of electrophotographic recording elements are known for use in electrophotography. In many conventional elements, the active photoconductive materials are contained in a single layer. This layer is coated on a suitable electrically conductive support or on a non-conductive support that is overcoated with an electrically conductive layer. In addition to single active layer electrophotographic recording elements, various multi-active electrophotographic recording elements are known. Such elements are sometimes called multi-layer or multi-active-layer elements because they contain at least two active layers that interact to form an electrostatic latent image.

Compositions comprising a polycarbonate resin having a photoconductor dispersed therein have been known for use in photoconductive layers of photoconductor elements of the type employable for use in electrophotographic processes. For example, U.S. Pat. No. 3,615,414 teaches multiphase heterogeneous compositions of a photoconductor, a thiapyrylium dye and a polycarbonate.

These compositions suffer from the disadvantage that the nonpolymeric photoconductors therein tend to be leachable by solvents, such as the solvents used in liquid toner developers.

SUMMARY OF THE INVENTION

This invention provides photoconductive block polycarbonate copolymers that comprise alternating polycarbonate blocks. The photoconductive blocks are selected from the group consisting of polyesters, polycarbonates, and mixtures thereof. In each photoconductive block, there is at least one photoconductive component that contains at least one functional group therein that has been incorporated with the structure thereof. The photoconductive blocks can either be incorporated into the polymer chain as a part of the backbone structure or can be pendant from the backbone chain.

These block copolymers are significantly more photosensitive than prior art photoconductive random polycarbonate polymers and exhibit no loss of photodecay speed after extended exposure to liquid developer carriers.

These photoconductive block polycarbonate polymers support dye-polymer particle aggregation with little or no bisphenol-A-polycarbonate being present in a layer. Prior art photoconductive random polycarbonate polymers either do not support dye-polymer aggregation at all, or support such aggregation at a rate which is not commercially practical.

The polycarbonate blocks interact with the dye molecules to form the aggregate charge generation structure. The photoconductive blocks transport charges from the aggregates during the photoconductive process.

Preferred photoconductive block polycarbonate polymers of this invention are solvent soluble so that they can be formed into coating solutions together with a dye. This solution is then coated upon a suitable substrate to form a photoconductive aggregate layer in a single layer photoconductive element. Solutions of the photoconductive block polycarbonate polymers can also be used to prepare charge transport layers that are coated over charge-generating layers.

Other and further aims, purposes, features, advantages and the like will be apparent to those skilled in the art taken with the accompanying claims.

DETAILED DESCRIPTION OF THE INVENTION
Polycarbonate Blocks

Polycarbonate polymers, particularly low molecular weight and oligomeric species, can be employed in the practice of the present invention.

For example, linear polymers can be employed having the following recurring unit:

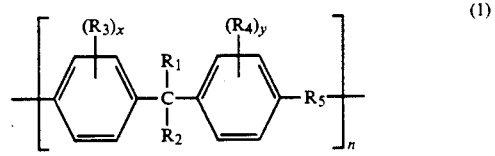

wherein $R_1$ and $R_2$ when taken separately can each be a hydrogen atom, an alkyl radical, a substituted alkyl radical, an aryl radical, or a substituted aryl radical;

$R_1$ and $R_2$ when taken together can represent the carbon atoms necessary to form a cyclic hydrocarbon radical containing up to 19 carbon atoms;

$R_3$ and $R_4$ can each be a hydrogen atom, a lower alkyl radical, or a halogen atom;

$R_5$ is a divalent radical selected from among

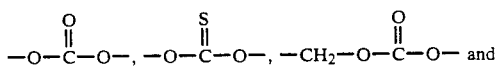

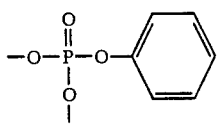

x and y are each independently an integer of 1 to 4; and n is an integer of 5 to 200.

Usually an alkyl radical contains less than 19 carbon atoms. The term "lower" as used herein before a radical such as "alkyl" or the like means that such radical contains less than 6 carbon atoms. Examples of alkyl radicals include methyl, ethyl, propyl, isopropyl, butyl, tertiarybutyl, pentyl, hexyl, heptyl, octyl, nonyl, decyl, and the like. Alkyl radicals can have straight or branched chains., Examples of substituted alkyl radicals include halo substituted radicals, such as chlorosubstituted and fluorosubstituted alkyl radicals, including trifluoromethyl, chloromethyl, and the like.

Preferred aryl radicals are phenyl and naphthyl. Substituents of substituted aryl nuclei include halo, alkoxyl, lower alkyl, and the like.

The term "halo" and the term "halogen atom" each includes fluorine, chlorine, bromine, and iodine.

Presently preferred block polymeric units of formula (1) are those wherein $R_1$ and $R_2$ are $CH_3$, $R_3$ and $R_4$ are H, $R_5$ is

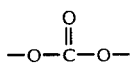

and n is 5 to 40.

Among particularly useful polycarbonates are block polymeric units having the following structure:

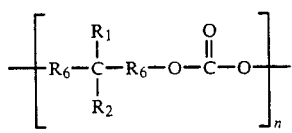

(2)

wherein:

$R_1$ and $R_2$ are as above defined in reference to formula (1);

$R_6$ is a divalent radical selected from among phenylene radicals, halo substituted phenylene radicials, and lower alkyl substituted phenylene radicals; and m is an integer of 5 to 40.

Such polymers are disclosed, for example, in U.S. Pat. Nos. 3,615,414; 3,028,365; and 3,316,466. Presently, preferred are polycarbonate units containing an alkylidene diarylene moiety in the recurring unit, such as those prepared with bisphenol A and including polymeric products of ester exchange between diphenylcarbonate and 2,2-bis(4-hydroxyphenyl)propane, sometimes herein termed bisphenol A polycarbonate. Such polymers are disclosed for example, in U.S. Pat. Nos. 2,999,750; 3,038,874; 3,038,879; 3,038,880; 3,106,544; 3,106,545; and 3,106,546; and published Australian Patent Specification No. 19575/56.

Additional examples of suitable polycarbonate block units include poly[4,4'-(hexahydro-4,7-methanoindan-5-ylidene)-diphenylene carbonate blocks represented by the formula:

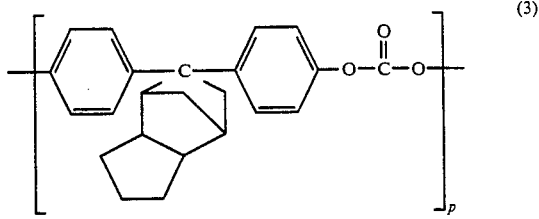

(3)

where p is an integer of 5 to 40 poly [4,4'-2(-norborenylidene)di-phenylene carbonate] blocks represented by the formula:

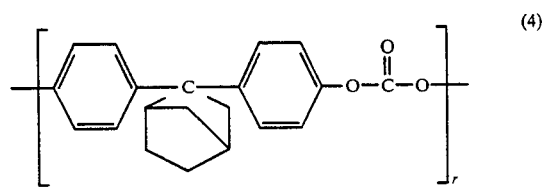

(4)

where r is an integer of 5 to 40; polycarbonate blocks of the formula:

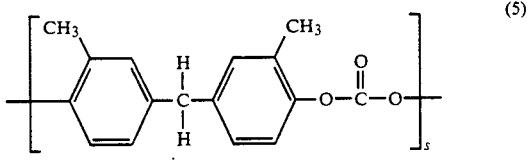

(5)

where s is an integer of 5 to 40; polyester blocks of the formula:

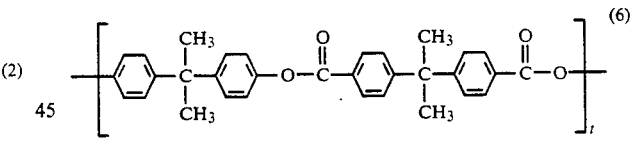

(6)

where t is an integer of 3 to 150; and polycarbonate blocks of the formula:

(7)

where u is an integer of 5 to 40; and the like.

PHOTOCONDUCTIVE BLOCK POLYMER UNITS

Typically the photoconductive block polymer units are comprised of reactive photoconductors which have been reacted with one or more monomers of the types used to make polycarbonates, polyesters, or mixtures thereof.

Presently preferred photoconductors are monomeric and contain two functional groups per molecule. These photoconductors can be incorporated structurally into block copolymer units. These photoconductors contain two or more reactive sites or functional groups per molecule. If more than two reactive sites are present, a photoconductor also acts as a branching monomer.

Photoconductors that contain a single reactive functional group per molecule operate as chain terminators or as pendant groups in block polymer units.

Mixtures of various photoconductors and various monomers can be employed in block formation.

The structure of a photoconductive polymer block unit can vary greatly, and various polymerization techniques known to the art can be used for the preparation thereof.

In, for example, the case of a photoconductive polyester block unit, various dicarboxylic acids and their functional equivalents, and various diols, known to the art of ester polymerization, can be used as monomeric starting materials. The photoconductor is preferably characterized by having two functional hydroxyl groups, or carboxyl groups. Methods for making polyesters are well known to the art.

For example, a photoconductor having two functional (reactable) carboxyl groups can be polymerized with excess diol to produce a polyester having terminal reactive hydroxyl groups derived from the diol A present preference is to produce an oligomeric polyester block comprised mainly of alternating units of residues of diol and photoconductor. The total number of repeating units in such an oligomeric block polyester is preferably in the range from about 2 to about 25. If the photoconductor has two reactive hydroxyl groups, it can be polymerized with a dicarboxylic acid to produce a corresponding polyester oligomer having terminal hydroxyl groups derived from the photoconductor. The number of repeating units, the arrangement of units (alternating), and the mole ratio of photoconductor to acid (or equivalent) in a block are preferably similar to those indicated above for a photoconductor/diol block. The number of repeating photoconductive groups present in a photoconductive polyester block can be regulated by controlling the mole ratios of monomers present during polymerization.

A hydroxyl group terminated photoconductive block polyester is then further polymerized with reactants that will introduce the desired polycarbonate blocks into a polymer incorporating the photoconductive block polyester. For example, when a photoconductive block polyester is employed, it can be polymerized with bisphenol A in the presence of phosgene. In the block copolymer, the mole ratio of photoconductive polyester blocks to polycarbonate blocks can range widely. However, it is presently preferred that the mole ratio be in the range of about 10:90 to about 70:30. The total number of repeating units in a polycarbonate block preferably is in the range of about 5 to about 40. In a photoconductive polycarbonate block copolymer, the total number of polycarbonate blocks is equal to the total number of photoconductive polyester blocks. Preferably, the total number of photoconductive polyester blocks is in the range of about 15 to about 170.

In the case of a photoconductive polycarbonate block unit, a photoconductor having two functional hydroxyl groups is preferably employed, and such photoconductor is conveniently reacted with phosgene in pyridine or the like in the presence of a polycarbonate block polymer after such a polycarbonate block polymer has been preformed. The polycarbonate block can be made, for example, by polymerizing bisphenol A and phosgene. The photoconductor becomes polymerized through repeating polycarbonate

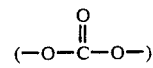

and forms a desired photoconductive polycar block. The number of repeating photoconductive residue groups in a photoconductive polycarbonate block can be regulated by controlling the mole ratios of monomers present in polymerization. The number of repeating units in the photoconductive block can range widely, but is preferably in the range of about 2 to about 25 units, while the number of repeating units in the (non-photoconductive) polycarbonate block likewise can range widely, but is preferably in the range of about 5 to about 40 units.

Photoconductive block copolymers of this invention containing either photoconductive block polyester units, or photoconductive block polycarbonate units, or mixtures of both are characterized by having inherent viscosities in the range of about 0.2 to about 1.2 as measured in dichloromethane at 0.25 g/dL at 25° C.

Thus, in a photoconductive polycarbonate block copolymer of this invention, the number of repeating units in a (non-photoconductive) polycarbonate block is in the range of about 5 to about 200 units, and the number of repeating units in a photoconductive block is in the range of about 2 to about 25 units of which about 30 to about 100% are residues derived from reactable photoconductors. The (non-photoconductive) polycarbonate block units alternate with photoconductive block units, and the total number of non-photoconductive polycarbonate block units and photoconductive block units is in the range of about 30 to about 400 units.

In general, the reactive photoconductors used in the practice of this invention are known to the prior art, and can be selected from among such classes of compounds as triarylamines; p-aminotetraarylmethanes; 4,4'-bis(p-amino)triarylmethanes; 1,1-bis(p-aminoaryl)isobutanes; 1,1-bis(p-aminoaryl)cyclohexanes; N-alkyl-N,N-diarylamines; N,N-dialkyl-N-arylamines; heterocyclic nitrogen compounds having 4 to 10 carbon atoms per molecule; and the like.

Representative examples of suitable photoconductors for use in the practice of this invention are identified in Table I below.

TABLE I

44'-dimethyl-4"-ethyltriphenylamine
4-(di-p-tolylamino)styrene
4,4'-bis(N-ethyl-N-2-hydroxyethylamino)-2,2'-dimethyltriphenylmethane
tri(-p-tolyl)amine
4-ethyltriphenylamine
4-(N-phenothiazinyl)styrene
4-(dibenzylamino)styrene
2,3,4,5-tetraphenylpyrrole
2,3,4,5-tetra-p-anisylpyrrole
2,3,5-triphenylpyrrole
p-diphenylaminocinnamide
4-formyltriphenylamine semicarbazone
4-cyanotriphenylamine
7-diethylamino-4-methylcoumarin
4-N,N-bis(p-bromophenyl)aminocinnamic acid
1-(4-diphenylamino)naphthacrylic acid 4-(diphenylamino)styrene
4-(di-p-anisylamino)styrene
4,4'-bis(diethylamino)-2,2'-dimethyltriphenylmethane
1,3,5-triphenyl-2-pyrazoline
β, β-bis(4-dimethylaminophenyl)styrene
2-(p-dimethylaminostyryl)furan
4-dimethylamino-2,5-distyryl furan
1,2,3-triphenylisoindole
1,2,4,5-tetraphenylimidazole
4,4'-bis(diphenylamino)chalcone
4-diphenylaminochalcone
4-carboxytriphenylamine
4-diphenylaminocinnamic acid
tetrakis(4-diethylaminophenyl)-1,4-xylylene
tetrakis(N-ethyl-N-benzylaminophenyl)-1,4-xylylene
4,4'-bis(diethylamino)-1,1,1-triphenylethane  4-diethylaminotetraphenylmethane
4,4'-bis-(diethylamino)tetraphenylmethane
4-dimethylaminotetraphenylmethane
tetrakis(4-dimethylaminophenyl)methane
4-diisopropylaminotetraphenylmethane
4-dibenzylaminotetraphenylmethane
2-methyl-4-diethylaminotetraphenylmethane
3-methyl-4-diisopropylaminotetraphenylmethane
4-trityl-N,N-dimethyl-c-napthylamine
4-trityl-N,N-diethyl-o-naphthylamine
3,3'-bis(1,5-diphenyl-2-pyrazoline)
1-ethylpiperidine
N,N-diethyl-N-(p-tolylazophenyl)amine
p-ditolylaminohydrocinnamic acid p0 N,N-diethylaniline
1,1-bis[4-(N-ethyl-N-hydroxyethylamino)-2-methylphenyl]isobutane
1,1-bis[4-(N-ethyl-N-hydroxyethylamino)phenyl]cyclohexane
methyl-N,N-p-ditolylaminohydrocinnamate
4-acetyltriphenylamine
4-hexanoyltriphenylamine
4-(p-diphenylaminophenyl)-3-buten-1-yne
1,1-bis(p-ditolylaminophenyl)cyclohexane
N,N-dimethyl-N-p-(2-quinolinylethenyl)-phenylaminejulolidine
N,N-dimethyl-N-p-(N'-ethyl-N'-tolylamino)phenylazophenylamine
N,N-diethyl-N-(6-methyl-4-oxo-4(H)-2-pyranylethenylphenyl)amine
N,N-dimethyl-N-(6-methyl-4-oxo-4(H)-2-pyranylethenylphenyl)amine
3,3'-bis[1-(4-tolyl)-5-phenyl-2-(4H)-pyrazoline]
4-(α-hydroxyethyl)triphenylamine
4-hydroxymethyltriphenylamine
4,4',4''-trimethoxytriphenylamine
4-carbethoxytriphenylamine
3-(p-diphenylamino)phenylpropionic acid
·methyl-3-(p-diphenylaminophenyl)propionate
1,1-bis(4-N,N-diethylaminophenyl)cyclohexane
tris(4-N,N-diethylamino-2-methylphenyl)methane
1,1-bis(4-di-p-tolylaminophenhyl)-2-methylpropane
N-vinylditolylamine
N-vinyldiphenylamine
N-ethylditolylamine
bijulolidyl
methyl-p-diphenylaminobenzoate
p-diphenylaminocinnamoyl chloride
3-(p-diphenylaminophenyl)-2-butenoic acid
4',4''-dibromo-4-formyltriphenylamine
p-(N-methyl-N-phenyl)aminobenzaldehyde
2-methoxytriphenylamine   4-acetyltriphenylamine oxime
N-methyl-N,N-p-isobutyldiphenylamine
N-methyl-N,N-p-cyclopentyldiphenylamine
N,N-p-isobutyldiphenyl-N-tolylamine
1,1-bis(4-N,N-diethylamino-2-methylphenyl)isobutane triphenylamine
1,1-bis(4-N-methyl-N-phenylaminophenyl)isobutane
1,1-bis(4-N-methyl-N-phenylaminophenyl)ethane; and
1,1-bis(4-N,N-diethylamino)-2,2'-dimethyltriphenylethane.

For purposes of preparation of polyester block units, suitable carboxylic acids (and functional equivalents) include dicarboxylic acids and functional equivalents, such as terephthalic acid, isophthalic acid, sulfoisophthalic acid, glutaric acid, di(lower alkyl) terephthalates, such as dimethyl terephthalate; di(lower alkyl) isophthalates, such as dimethyl isophthalate; di(lower alkyl)-glutarates, such as dimethyl glutarate, di(lower alkyl) adipates, such as dimethyl adipate; and the like.

Suitable dihydroxyl monomers (glycols or diols) include ethylene glycol, 1,4-butanediol, neopentyl glycol, 1,5-dihydroxy-3,3-dimethylpentane, 1,4-dihydroxy-2-methylpropane, 1,4-cyclohexanedimethanol, 1,4-cyclohexanediethanol, di(4-hydroxy-n-butyl)ether, and the like.

Polyfunctional compounds having one or more carboxyl groups, and one or more hydroxyl groups, can also be employed. Various polyols or polyacids are conventionally used to create branching in the polyester chain, such as triols, tetraols, tricarboxylic acids or functional equivalents, and the like. Examples of such branching agents include pentaerythritol, 1,3,5-trihydroxyl pentane, 1,5-dihyroxyl-3-ethyl-3-(2-hydroxy)ethyl pentane, trimethylolpropane, tetraethylolmethane, trimellitic anhydride, pyromellitic dianhydride, and the like. A presently preferred polyol is glycerol. Preferably up to about 10 mol percent of a starting monomer mixture is comprised of at least one polyol or polyacid containing three or more functional hydroxyl or carboxyl groups per molecule.

Preferred photoconductor blocks are polyesters of Formula 9.2 and polycarbonates of Formula 10.1 and a preferred polycarbonate block is bisphenol-A-polycarbonate (Formula 14).

Photoconductive polycarbonate block copolymers of this invention are employed in layers in photoconductor elements. For this purpose, a coating solution of such a block copolymer is prepared in combination with an electrophotographic sensitizing dye or mixture of such dyes.

Particularly useful dyes in the present invention are pyrylium dyes, including pyrylium, thiapyrylium and selenapyrylium dye salts which are capable of forming sensitizing and photoconductor composition of this invention. One suitable class of such dyes can be represented by the following generic formula:

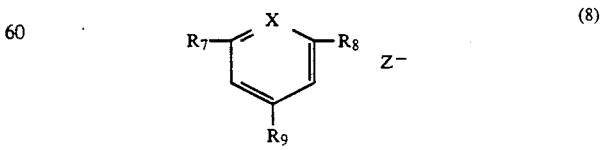

(8)

wherein $R_7$ and $R_8$ are aryl radicals selected from the group consisting of phenyl and substituted phenyl having at least one substituent selected from the group consisting of lower alkyl radicals and lower alkoxy radicals;

$R_9$ is a lower alkylamino-substituted phenyl radical;

X is selected from the group consisting of selenium, sulfur and oxygen; and

Z is an anion.

Examples of suitable anions include perchlorate, fluoroborate, iodide, chloride, bromide, sulfate periodate, p-toluenesulfonate, and the like.

Examples of suitable pyrylium dyes are shown, for instance, Table I of U.S. Pat. No. 3,615,414, columns 5, 6, and 7, which is incorporated here by reference.

Solvents useful in forming such solutions include organic solvents, such as aromatic hydrocarbons, such as benzene, toluene, and the like; ketones, such as acetone, methylethyl ketone, and the like; halogenated hydrocarbons, such as methylene chlorides, ethylene chlorides, and the like; alcohols, like methanol, ethanol, benzylalcohol, and the like; and mixtures thereof.

On a 100 weight percent total solids basis, the quantity of photoconductive polycarbonate block copolymer employed is in the range of about 95 to about 99 weight percent while the quantity of such dye is in the range of about 1 to about 5 weight percent.

Various additives, such as surfactants, plasticizers, cross linking agents, and the like can be present, preferably in dissolved form. The total amount of such additives is less than about 1 weight percent (same total solids basis).

Presently preferred additives are DC-510T ™, a surfactant manufactured by Dow-Corning.

In such a coating solution, the total amount of solids conveniently is in the range of about 5 to about 15 weight percent with the balance up to 100 weight percent being solvent.

Such a liquid composition is typically coated as a photoconductor onto a conventional electrically conducting support or layer, such as conductive paper, metal foil, semiconductor dispersed in a resin, vacuum deposited metal layer on a plastic film, such metal being nickel, aluminum, silver, chromium, or the like.

Suitable supporting films include polyethylene terephthalate, polystyrene, polycarbonate, cellulose acetate, and the like.

The conductive layer, if desired, can be overcoated with a thin layer of insulating material, which can be comprised of a conventional electrically insulating binder resin.

Coating thicknesses of such a liquid composition can vary widely. Typical wet coating thicknesses are in the range of about 0.002 inch to about 0.02 inch. Typical dried coatings are about 5 to 25 microns thick, preferably 8 to 12 microns thick.

After drying, conveniently at ambient temperatures, the resulting coating is preferably subjected to curing conditions, which are preferably temperatures of about 60° to about 90° C. applied for times of about 10 to about 60 minutes.

The layers are characteristically photosensitive to the extent that 80 percent of an initial surface charge can be discharged by exposure to radiant energy of less than 100 erg/cm$^2$ and preferably less than 10 erg/cm$^2$. These energy values are sometimes referred to as the "photodecay" or the "photodecay speed" of a photoconductive film. Ideally, dark decay should be zero, but in practice values of less than 5 volts/sec are desirable. Photodecay and dark decay values are measured by standard techniques. Schaffert, R. M., 1975. *Electrophotography*, 2nd Ed. New York: John Wiley & Sons.

The presence of polymer dye aggregates in an electrophotographic photoconductor element of this invention can be demonstrated by various means. For example, the presence of polymer-dye aggregation is shown by the presence of a shift in λ-max as well as by an increase in relative photosensitivity. The λ-max shift is preferably at least about 50mm. The increase in relative photosensitivity is typically at least about 100 (units).

This shift in λ-max is measured by comparing the visible absorption spectrum of an aggregated photoconductor element (film) with the spectrum of an unaggregated film containing the same dye.

Relative sensitivity represents the relative energy required to discharge a photoconductive film from the initial surface potential to some residual fraction of that surface potential, as compared to the control film which is arbitrarily assigned a relative sensitivity value of 100. In other words, relative sensitivity is the ratio of the sample photodecay speed to the control photodecay speed. In the present invention, photodecay speeds were measured for monochromatic exposure at 670 nm on the front surface of photoconductor films that had been charged to $+/-500$ volts. The speeds, in erg/cm$^2$, were determined for photodecays to $+/-100$ volts, unless otherwise indicated.

The photoconductive polycarbonate block copolymers of this invention are useful in nonaggregated layers as well as aggregated layers of photoconductive single layer or multi-element photoconductor elements. They are also useful in charge transport and/or charge generation layers of multilayered photoconductor elements. Such layers may be used advantageously with additional layers. For example, overcoat layers do not effect photoconductor content. Also, barrier layer laydown may be aided, and compatibility with other layers may be enhanced, for example, with low surface energy layers or emitter layers. As above indicated, these photoconductive polycarbonate block copolymers may be used in combination with a variety of additives, such as spectral or chemical sensitizers, adhesives, other monomeric, non-monomeric, or polymeric photoconductors, and the like, such as are known in the art for use in electrographic elements. Various polymeric binders may be utilized, if desired, in combination with the carbonate block copolymers of this invention, but are not necessary. Mixtures of different photoconductive polycarbonate block copolymers of this invention can be employed. Various conductive supports may be utilized. Mixtures of dye components may be utilized. Latent electrostatic images formed in elements utilizing a block copolymer of this invention may be developed with dry developers or liquid developers.

Electrographic photoconductor elements containing these block copolymers exhibit improved wear, and electrical granularity (which appears as objectionable background density), since the film or layer surface is smoother, with less interfacial regions present, such as can occur between dye/binder, dye/photoconductor, photoconductor/binder, and the like. Photoconductivity and photosensitivity are improved since a polymeric photoconductor of this invention can contain a significantly greater fraction of the photoconductive moiety than is possible, for example, in mixed monomeric photoconductor/binder layer compositions where the photoconductor content is limited by the solubility of the photoconductor in the binder polymer.

By variation of polymer blocks and molecular weight, the electrical properties of a block copolymer of this invention and of electrographic elements containing such can be controlled. The $T_g$ of these polymers may be varied for certain improvements. A variety of difunctional starting materials are useful in the preparation of these block copolymers; for example, the photoconductive residues can be present as either the diol or the diacid function, and either in the backbone, or pendant from the backbone, in the block copolymer polymeric chain.

The photoconductive block copolymers of this invention are preferably used to form dye-polymer aggregate electro-photographic elements. The charge-generating blocks of such elements are preferably polycarbonate blocks which have interacted with thiapyrylium dyes. The charge-transporting blocks, which contain photoconductors such as listed in Table I above, transport charges from the charge-generating aggregate blocks during the photoconductive process.

Single layer aggregate (SLA) films containing any one of our photoconductive block copolymers and a thiapyrylium dye exhibit all of the required traits of a high performance photoconductor including high photodecay speed, low dark decay, and stable electrical regeneration (Cf. U.S. Pat. No. 3,615,414). In addition, SLA films of our block copolymers do not lose photosensitivity upon repeated exposure to liquid electrographic developer solvents because no low molecular weight charge transport agents (CTA) are present to be leached out of the films by the solvents. The plasticization effect of low molecular weight CTA's is also thus avoided, which may make SLA films of our block copolymers more resistant to abrasive wear such as occurs during a normal electrographic dry development process. Thus, SLA films of our block copolymers are suitable for use in either dry or liquid developed electrographic processes. In addition, building the charge transport agent into the aggregate-supporting polymer permits higher CTA loading than is possible with either low molecular weight CTA's or with random, non-aggregating polymeric photoconductors, which may result in higher photodecay speeds. In addition, the presence of the dye-polycarbonate aggregate complexes and the CTA's within the same macromolecular structure may improve the efficiency of the transfer of charge from the aggregate to the CTA, either intra- or intermolecularly. The polycarbonate block may also be varied in order to alter the aggregate morphology, which in conjunction with the nearby CTA moieties, may also improve charge transfer efficiency or overall photodecay curve shape (contrast). Finally, since single layer aggregate films of our photoconductive block copolymers need contain only one polymer and one dye, and since that dye is completely incorporated within the macromolecular framework by the aggregation phenomenon, such films contain essentially no regions of phase separation or interfacial discontinuity as may be found in conventional single layer aggregate films. Since these interfacial regions are thought to be an important source of electrical granularity (or electrical noise), films of our block copolymers may exhibit much less electrical granularity and concomitant higher image quality.

The copolymers of the present invention may be used in multi-active-layer photoconductive films such as described in U.S. Pat. No. 4,175,960. The charge generating layer (CGL) of multilayer films may comprise a dye and one of the aggregate-supporting photoconductive block copolymers. All the advantages cited above relating to aggregate/CTA interactions would also be present in such a CGL. One of the photoconductive block copolymers could also be used as the charge transporting layer of a multi-active-layer film. The advantages cited above are also exhibited in this use, especially solvent resistance, wear resistance, higher CTA loading, and lower electrical noise. Improved charge injection efficiency may also occur at the CTL/CGL interface.

EXAMPLE 1

Preparation of Photoconductive Polycarbonate Block Copolymer

A photoconductive block of a diol-terminated polyester oligomer was synthesized, and then reacted with phosgene and bisphenol-A to form a photoconductive polycarbonate block copolymer as shown in Formula 9.3 (below). The monomeric photoconductor diacid employed is shown in Formula 9.1 (below) which monomer was polymerized with 1,4-butane diol to produce the polyester oligomer shown in Formula 9.2 (below) wherein n is an integer in the range of about 2 to about 5. This oligomer was then converted to a polycarbonate block copolymer as shown in Formula 9.3 wherein n has the value above indicated. The procedures appear after the following equation (9) which shows the involved compounds and the reactions:

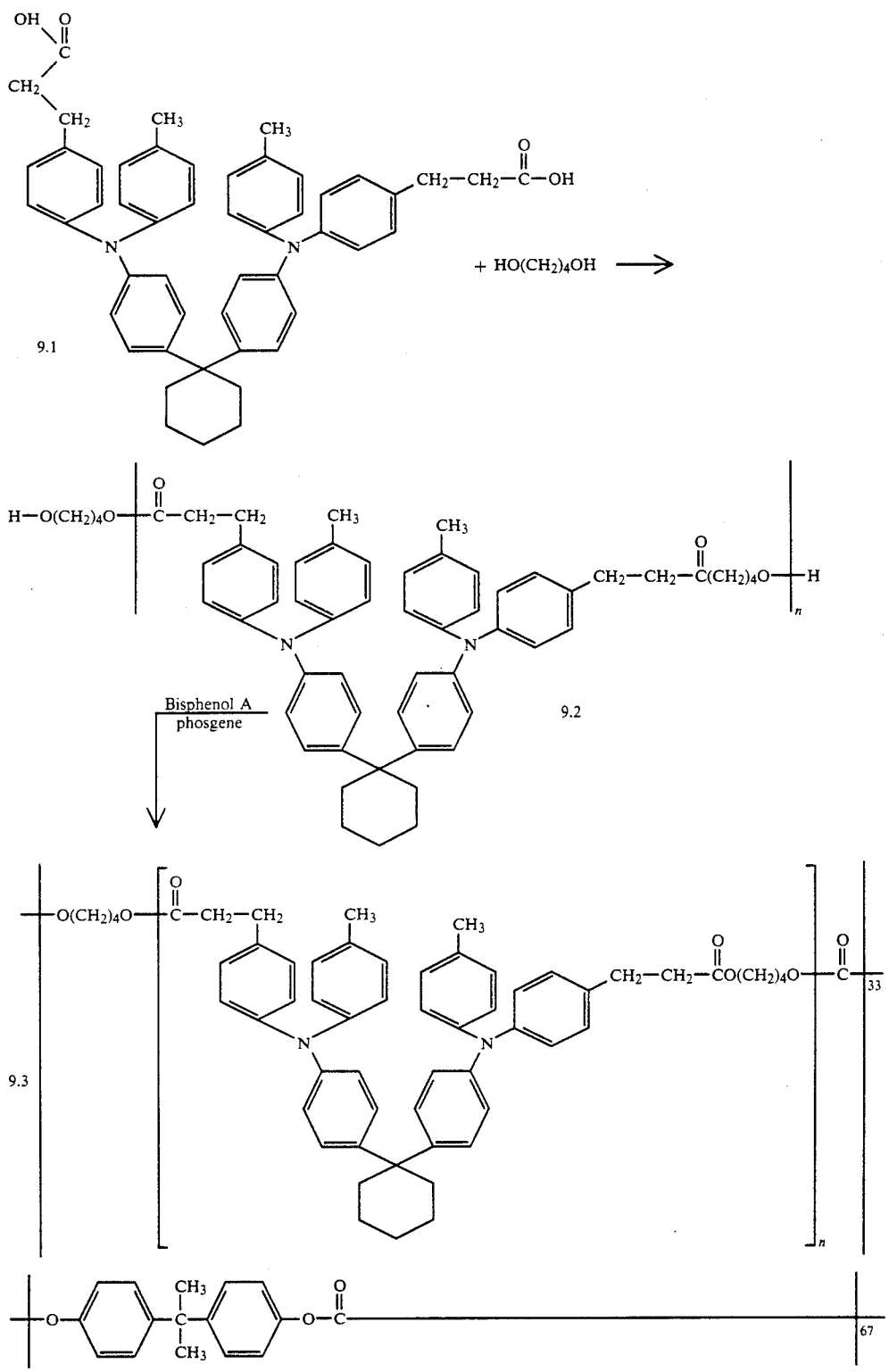

Polyester Oligomer Preparation

The Formula 9 of diacid (7.4 g, 0.01 mol) and 1,4-butanediol (1.8 g, 0.020 mol) were melted under a nitrogen atmosphere at 200° C. in a 25 ml melt polymerization flask. Esterification was allowed to proceed for 3 hrs at 200° C., with nitrogen bubbling through the melt. The temperature was raised to 220° C. and the reaction continued for 2 hours more. The melt was then cooled to 200° C., and placed under partial vacuum for 5 minutes, and then under full vacuum (100-250 μm) for 13 minutes. The reaction mixture was cooled to room temperature, dissolved in dichloromethane, and filtered. Removal of solvent under vacuum at 80° C. gave the polyester oligomer of Formula 9.2 as 3.6 g of pale yellow solid, $M_n=2{,}700$, $M_w=5{,}300$, $T_g=73°$ C.

Block Polycarbonate Preparation

The polyester oligomer of Formula 9.2 (3.3 g) and bisphenol-A (1.9 g, 0.0084 mol) were dissolved in pyridine (1.0 g) and dichloromethane (27 g) under nitrogen in a 100 ml, three-necked, round-bottomed flask equipped with mechanical stirrer and dropping funnel. A solution of phosgene (1.2 g, 0.012 mol) in 20 ml dichloromethane was added dropwise to the above solution. The mixture was washed twice with dilute hydrochloric acid, three times with 10% acetone in water, filtered, and precipitated into isopropyl alcohol. The polymer was washed, soaked overnight in isopropyl alcohol and filtered. Removal of residual solvent under vacuum at 80° C. yielded the block polycarbonate of Formula 9.3 as 5.1 g of an off-white amorphous solid polymer, i.v.=0.26 ($CH_2Cl_2$), $M_n=10{,}700$, $M_w=22{,}500$, dispersity=2.1. The NMR spectrum indicated this polymer contained approximately 24 mole percent of the Formula 9.1 compound, and 76 mole percent of bisphenol A.

EXAMPLE 2

Preparation of Photoconductive Polycarbonate Block Copolymer

A photoconductive polycarbonate block copolymer is prepared by the following equation:

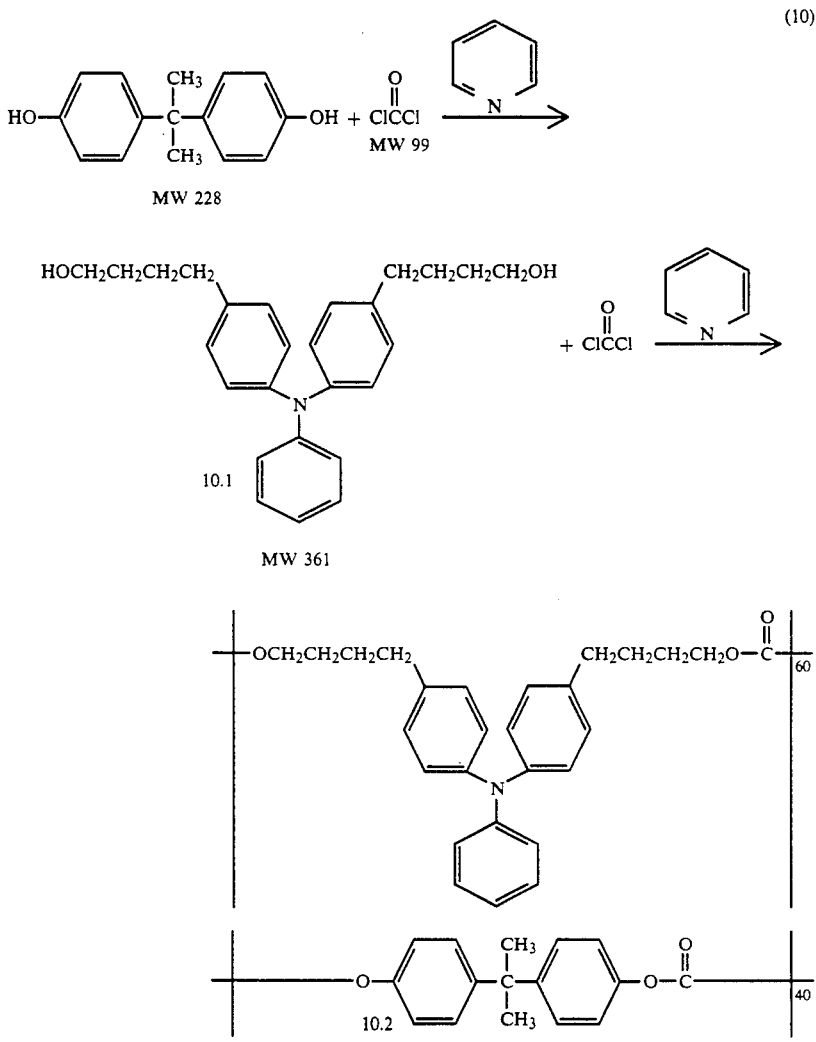

Bisphenol-A (23.0 g, 0.10 mol) was dissolved under nitrogen in 22 g (0.28 mol) of pyridine and 200 ml of dichloromethane in a two-liter, three-necked, round-bottomed flask equipped with mechanical stirrer and dropping funnel. A solution of phosgene (9.0 g, 0.090 mol) in 100 ml of cold dichloromethane was added to the bisphenol-A solution with rapid stirring and cooling, in an ice water bath.

The reaction mixture was stirred at room temperature for 5–10 minutes before a solution of the photoconductive diol monomer of Formula 10.1 (54.0 g, 0.15 mol) in 22 g (0.28 mol) of pyridine and 200 ml of dichloromethane was added. More phosgene (18 g, 0.18 mol) in dichloromethane (250 ml) was added as before with initial rapid stirring and cooling. As the solution viscosity increased, the phosgene solution was added more slowly. The reaction was stirred for another hour and then allowed to stand overnight. The reaction mixture was washed twice with dilute hydrochloric acid and three times with 10% acetone in water. The polymer was precipitated into isopropyl alcohol. The polymer was washed twice, soaked overnight in isopropyl alcohol, filtered, and dried under vacuum at 80° C. Yield of the off-white amorphous solid polymer was 56.7 g, $T_g=29°$ and 80° C., $M_n=21,900$, $M_w=53,900$, $M_z=86,800$, dispersity=2.45. Elemental analysis: found N=2.3%, calculated N=2.5% (based on 60% of Formula 10.1 diol monomer). NMR: 54% photoconductor, 46% bisphenol-A.

EXAMPLE 3

Preparation of Photoconductive Random Polycarbonate (control for comparison purposes)

A 300 ml, three-necked, round-bottomed flask equipped with a nitrogen atmosphere, dropping funnel and mechanical stirrer was charged with the photoconductor diol monomer of Formula 10.1 (10.8 g, 0.030 mol) and bisphenol-A (46.0 g, 0.020 mol). Pyridine (8.7 g, 0.11 mol) and dichloromethane (80 ml) were added to dissolve the diols, followed by cooling in an ice water bath. A solution of phosgene (5.3 g, 0.053 mol) in 70 ml cold dichloromethane was added with stirring, rapidly at first, then more slowly as the polymerization neared completion. Stirring was continued overnight. The reaction mixture was washed twice with dilute hydrochloric acid, three times with 10% acetone in water, filtered, and precipitated into isopropyl alcohol with rapid stirring. The polymer was washed, soaked in isopropyl alcohol overnight, filtered, and dried under vacuum at 80° C. Yield of the off-white amorphous solid polymer was 11.1 g, $M_n=13,000$, $M_w=32,400$, $M_z=54,700$, dispersity=2.48, i.v.=0.35 ($CH_2Cl_2$). NMR: 58% photoconductor, 42% bisphenol-A.

EXAMPLE 4

Preparation of Single Layer Photoconductor Elements

Photoconductive aggregated single layer elements were prepared, one with a photoconductor block polymer of this invention and one with a photoconductive random polymer control, as follows:

A mixture of dichloromethane (10.8 g), 1,1,2-trichloroethane (7.2 g), and 4-(p-dimethylaminophenyl)-2,6-diphenylthiapyrylium hexafluorophosphate dye (0.040 g) was stirred for 16 hours. The photoconductive polymer and any optional added bisphenol-A-polycarbonate (Lexan 145 TM) was added to the dye solution and stirring was continued for 8 hours: the actual polymer(s) in each sample is listed in Table II. The resulting solutions were hand coated with a 0.006-inch wet deposit coating blade onto a vapor deposited, electrically conductive layer on a polyester film support (prepared as described in U.S. Pat. No. 4,173,472) secured by vacuum to a coating block maintained at 32° C. Each coating was allowed to air dry on the warm coating block for several minutes, then for 30 minutes in an oven at 90° C. The thickness, visible absorption spectrum, dark decay, and photodecay of each coating was measured using standard methods. The results are listed in Table II.

TABLE II

| Example No. | Footnote Showing Type of Photoconductive Polycarbonate | Weight Fraction of Bp.A.pc[1] | Film Thickness (microns) | 400–700 nm λ-max (nm) | 400–700 nm D-max | +500 → +100 V Relative Sensitivity[2] | Dark Decay v/s | −500 → −100 V Relative Sensitivity | Dark Decay v/s[2] |
|---|---|---|---|---|---|---|---|---|---|
| 4.1 | (3) | 0.000 | 9.0 | 575 | 1.23 | <<26 | 2.1 | <<51 | 0.6 |
| 4.2 | (3) | 0.005 | 8.0 | 587 | 1.22 | 39 | 2.3 | 81 | 1.6 |
| 4.3 | (3) | 0.010 | 9.0 | 670 | 1.61 | 100[2] | 2.8 | 100[2] | 1.1 |
| 4.4 | (3) | 0.020 | 9.0 | 673 | 2.59 | 163 | 2.5 | 69 | 1.0 |
| 4.5 | (3) | 0.030 | 9.0 | 669 | 1.57 | 52 | 1.6 | 127 | 0.9 |
| 4.6 | (3) | 0.040 | 8.0 | 673 | 2.42 | 121 | 2.6 | 91 | 0.6 |
| 4.7 | (4) | 0.000 | 8.0 | 573 | 1.11 | <<26 | 0.9 | <<51 | 1.1 |
| 4.8 | (4) | 0.005 | 8.0 | 575 | 1.13 | " | 1.4 | " | 1.5 |
| 4.9 | (4) | 0.010 | 8.0 | 574 | 1.15 | " | 1.9 | " | 1.4 |
| 4.10 | (4) | 0.020 | 9.0 | 574 | 1.17 | " | 1.8 | " | 1.4 |
| 4.11 | (4) | 0.030 | 8.0 | 571 | 1.10 | " | 2.2 | " | 1.4 |
| 4.12 | (4) | 0.040 | 8.0 | 565 | 1.10 | " | 1.7 | " | 1.1 |
| 4.13 | (5) | 0.008 | 9.0 | 675 | 3.73 | 100[2] | 1.4 | 100[2] | 0.8 |
| 4.14 | (5) | 0.010 | 9.5 | 673 | 3.46 | 69 | 1.3 | 74 | 0.6 |
| 4.15 | (5) | 0.148 | 9.5 | 674 | 3.75 | 83 | 1.4 | 86 | 0.6 |
| 4.16 | (6) | 0.008 | 9.0 | 571 | 1.22 | <41 | 0.2 | <64 | 0.7 |
| 4.17 | (6) | 0.010 | 9.5 | 480 | 1.18 | <47 | 0.6 | <74 | 1.8 |
| 4.18 | (6) | 0.148 | 9.0 | 675 | 3.78 | <41 | 0.7 | 60 | 0.5 |

Table II footnotes
[1]Weight fraction of bisphenol-A-polycarbonate (Lexan 145 TM) included in coatings formulation, e.g., 0.010 means 1% of the total solids is polycarbonate.
[2]Relative sensitivity is the reciprocal of the relative energy required to discharge a photoconductive element from ±500 volts to ±100 volts residual potential as compared to an element arbitrarily assigned a relative sensitivity value of 100.
[3]Photoconductive block copolymer containing 30 mole percent of photoconductive monomer of Formula 9.1 and 70 mole percent of bisphenol A polycarbonate, but prepared according to the procedure of Example 2 above. The structure of this polymer is shown below as Formula 12 wherein X is 30.
[4]Photoconductive random copolymer control containing 30 mole percent of photoconductive monomer of Formula 9.1 and 70 mole percent of bisphenol A polycarbonate, but prepared according to the procedure of Example 3 above. The structure of this polymer is shown below as Formula 12 wherein x is 30.
[5]Photoconductive block copolymer containing 50 mole pecent of photoconductive monomer of Formula 10.1 and 50 mole percent of bisphenol A polycarbonate, but prepared according to the procedure of Example 2 above. The structure of this polymer is shown above as Formula 10.2 wherein x is 50 mole percent.
[6]Photoconductive random copolymer containing 50 mole percent of photoconductive monomer of Formula 10.1 and 50 mole percent of bisphenol A polycarbonate, but prepared according to the procedure of Example 3 above. The structure of this polymer as shown above as Formula 10.2 wherein x is 50 mole percent.

The block polycarbonate of Formula 11 is as shown below:

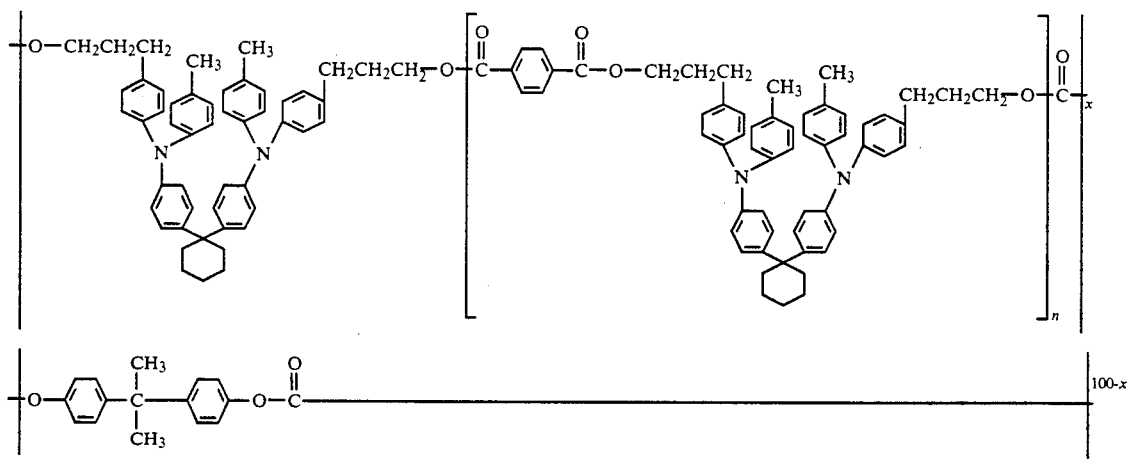

The structure of the random photoconductive polycarbonate copolymer of Formula 12 is shown below:

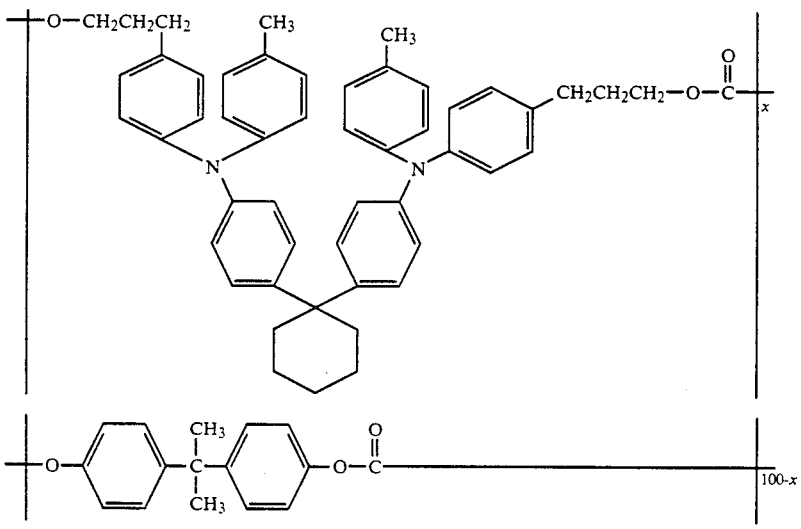

The structure of the random copolymer of Formula 13 is shown below:

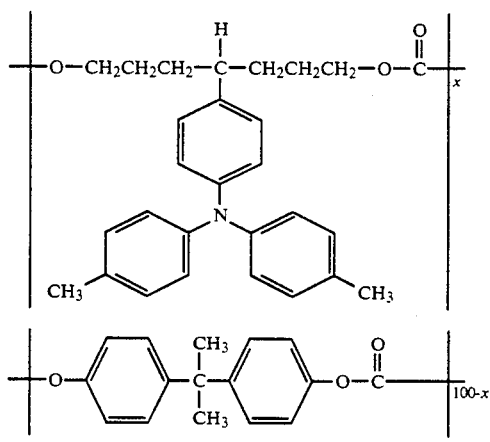

With reference to Table II, polymer-dye aggregation is evidenced by a shift in λ-max from 500–600 nm to 600–700 nm, as well as a general increase in relative sensitivity. The random photoconductive polycarbonate controls show no aggregation, with the exception of Example 4.18, in which 14.8% of the bisphenol-A-polycarbonate is needed for dye aggregation, and the sensitivity of this photoconductive polymer is low. The block polymers of the invention, however, required very small percentages of bisphenol-A-polycarbonate to achieve aggregation, such as Examples 4.3, 4.13 and 4.14. Further experiments described below will show that even this very small percentage of added polycarbonate is not necessary to achieve aggregation under the proper conditions.

Small variations in the data are due to hand coating variables, such as in Examples 4.14 and 4.15, or to incomplete nucleation, such as in Examples 4.3 and 4.5.

EXAMPLE 5

Preparation of Single Layer Photoconductor Elements

Single layer aggregate photoconductive films were prepared and tested as described in Example 4, utilizing a photoconductive polycarbonate block copolymer prepared as in Example 2, but with varying the respective weight fractions of optionally added bisphenol-A-polycarbonate. Results are shown in Table III.

TABLE III

| | Weight fractins | 400-700 nm | | Film Thickness | Photodecay at 670 nm | |
| | | | | | Relative Sensitivity[1] +500 V → +100 V | Dark Decay |
|---|---|---|---|---|---|---|
| Ex. | Bp.A.pc.[3] | λ-max (μm) | D-max | (μm) | | |
| 5.1 | 0.010 | 673 | 2.72 | 9.0 | 100[2] | 1.2 |
| 5.2 | 0.005 | 674 | 2.93 | 10.0 | 94 | 1.3 |
| 5.3 | 0.0025 | 673 | 2.55 | 8.5 | 97 | 1.3 |
| 5.4 | 0.00 | 602 | 1.12 | 9.0 | 32 | 1.4 |

Table III footnotes
[1]See Table II, Example 4.
[2]Arbitrarily assigned a value of 100.
[3]"Bp.A.pc" designates bisphenol-A-polycarbonate and "weight fraction" indicates quantity of bisphenol-A-polycarbonate included in film formulation. The structure of this polymer is shown in Formula 14 where n is 250.

The structure of the polycarbonate of Formula 14 is:

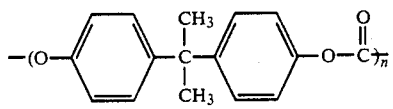

For the 2% dye load used in the polymer employed in these films, 1% by weight of bisphenol-A polycarbonate is the theoretical minimum amount of polymer needed to completely aggregate the dye. This assumes that one molecule of dye combines with one bisphenol-A unit. In films 5.2 and 5.3, the amount of bisphenol-A polycarbonate present is less than this theoretical lower limit, yet the aggregation is essentially identical with that of film 5.1, which contains exactly the minimum. Therefore, it is the photoconductor block polycarbonate that is supporting the aggregation, not the small amount of bisphenol-A polycarbonate.

EXAMPLE 6

Effect of solids content in coating

To illustrate the effect of percent solids concentration in the coating, a series of films were formulated, coated, and tested as in Example 4, except that no bisphenol-A-polycarbonate was added and the solids content of the coating solutions varied as in Table IV. The photoconductive polycarbonate block copolymer tested was prepared as in Example 2 and had the structures shown in Formula 10.2. Results are listed in Table IV.

TABLE IV

| | | | Thickness | 400-700 nm | | 670 nm Photodecay Relative Sensitivity | |
|---|---|---|---|---|---|---|---|
| Ex. | % Solids | Time* hrs | (μm) | λ-max (μm) | D-max | +500 → +100 V | −500 → −100 V |
| 6.1 | 15 | 90 | 11.0 | 675 | 1.52 | 100** | 100** |
| 6.2 | 10 | 90 | 7.0 | 591 | 0.99 | <22 | 49 |
| 6.3 | 5 | 90 | 4.0 | 589 | 0.87 | <22 | <33 |

*Time elapsed between addition of photoconductive polycarbonate block copolymer to dye solution, and coating.
**See Table II, Example 4.

As demonstrated in Table IV, photoconductive polycarbonate block copolymer supports aggregation with no additional bisphenol-A-polycarbonate present. The higher the solids content of the coating solution, the more complete is the aggregation.

EXAMPLE 7

Effect of time period between polymer addition and coating

To illustrate the effect of time span between addition of photoconductive polycarbonate block copolymer to the dye solution, and the actual coating onto a support, the following films were formulated as identified below, stirred for a given time, coated and tested as described in Example 4. The results are listed in Table V.

Formulation Photoconductive polycarbonate block copolymer of Example 2—2.94 g thiapyrylium dye of Formula 15—0.06 g dichloromethane—16.2 g DC-510 ® surfactant (Dow-Corning)—0.002 g The structure of Formula 15 is as follows:

TABLE V

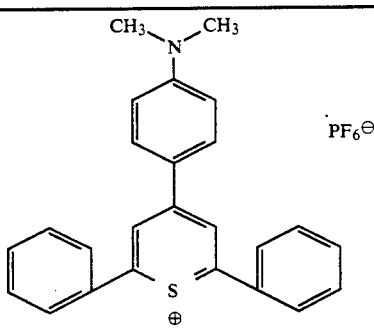

| Stirring time (hrs) | 400-700 nm | | Relative Photosensitivity[1] | |
|---|---|---|---|---|
| | λ-max | D-max | +500→+300 | −500→−300V |
| 8 | 606 | 1.014 | 100[2] | 100[2] |
| 24 | 670 | 1.031 | 118 | 110 |
| 31 | 672 | 1.065 | 137 | 142 |
| 144 | 675 | 1.162 | 176 | 174 |

Table V footnotes
[1]See Table II, Example 4
[2]Arbitrarily assigned a value of 100.

As evidenced by Table V, the films with no bisphenol-A-polycarbonate present show that stirring for a sufficiently long time allowed nucleation sites to form in solution, and that aggregation then occurred upon coating.

Thus, bisphenol-A-polycarbonate is not necessary for formation of the dye-polymer aggregate, but addition of a small amount of bisphenol-A-polycarbonate does reduce the time required for nucleation.

EXAMPLE 8

Further examples of photoconductive polycarbonate block copolymers were prepared to demonstrate the breadth of this invention. The polymers were synthesized using techniques described in Examples 1 and 2. A single layer aggregate photoconductive element of the type described in Example 4 was then prepared using each of these further examples. Each film contained 1.0% bisphenol-A-polycarbonate. Test results are listed in Table VI below.

TABLE VI

| Ex. | Photoconductive Block Copolymer | Film thickness (microns) | 400–700 nm λ-max (nm) | D-max | Relative Sensitivity +500 to +100 V | Relative Sensitivity −500 to −100 V |
|---|---|---|---|---|---|---|
| 8.1 | (1) | 10.0 | 671 | 2.34 | 100* | 100 |
| 8.2 | (2) | 10.0 | 675 | 3.49 | 423 | 241 |
| 8.3 | (3) | 10.0 | 675 | 3.36 | 109 | <30 |
| 8.4 | (4) | 10.0 | 673 | 2.52 | 114 | 126 |

(1) Formula 10.2
(2) Formula 9.3
(3) Formula 11 where x = 50
(4) Formula 13 where x = 60
*Arbitrarily assigned the value 100.

EXAMPLE 9

Three photoconductive compositions were used, as follows:
1) Polyester of Formula 16
2) Block copolymer of Formula 9.3 where n was 5.
3) Blend of photoconductor of Formula 17 with Lexan 145 TM polycarbonate obtained from General Electric.

The polyester of Formula 16 is as shown below:

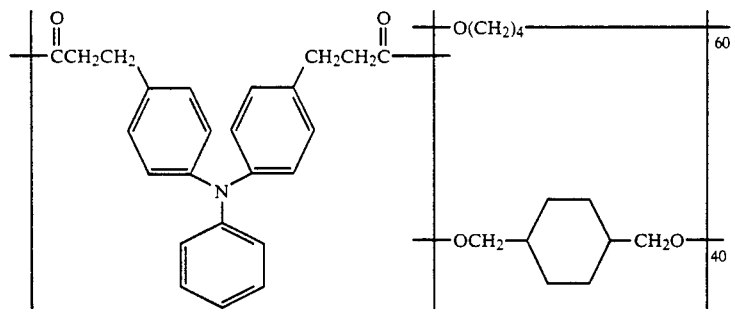

The photoconductor of Formula 17 is shown below:

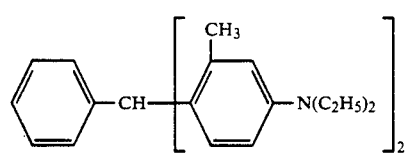

Each of these polymers was prepared into a single layer aggregate film element using a coating formulation as identified in the following Table VII. Each coating composition was coated on a conductive substrate, using an extrusion hopper.

TABLE VII

| Component | (1) film | (2) film | (3) film |
|---|---|---|---|
| dichloromethane | 135 g | 108 g | 135 g |
| 1,1,2-trichloromethane | 90 | 72 | 90 |
| Sensitizing Dye[1] | 0.50 | 0.40 | 0.50 |
| Photoconductor | (2) | (3) | (4) |
| Photoconductor weight | 17.4 | 19.4 | 10.0 |
| Lexan 145 ®[5] | 7.36 | 0.20 | 14.5 |
| DC510 ®[6] | 0.025 | 0.025 | 0.025 |

Table VII footnotes
[1] Formula 15.
[2] Formula 16.
[3] Formula 10.2.
[4] Formula 17.
[5] "Lexan 145" polycarbonate is obtained from General Electric.
[6] DC510 is a surfactant distributed by Dow-Corning.

Each film was tested for spectral sensitivity and 670 nm photodecay before and after each film was either immersed in Isopar G ®, or fumed with Isopar G ® for two weeks. Isopar G ® is a brand of high purity mixed isoparaffinic material marketed by Exxon Corp. Results are listed in Table VIII.

TABLE VIII

| Film No. | Film Thickness (μm) | 400–700 nm λ-max | D-max | 670 nm Photodecay Relative Sensitivity[1] +500 → +100 V Control | Immersed | Fumed |
|---|---|---|---|---|---|---|
| 1 | 10.0 | 676 | 3.80 | 100[2] | 92 | 92 |
| 2 | 11.0 | 675 | 3.81 | 100[2] | 91 | 88 |
| 3 | 10.0 | 677 | 3.94 | 100[2] | 24 | <10 |

Table VIII footnotes
[1] See Table II, Example 4.
[2] Arbitrarily assigned a value of 100.

Table VIII shows that the film made with the photoconductive block copolymer of this invention (No. 2) displays the same superior solvent resistance as the film made with a photoconductive random polyester (No. 1. Both polymeric photoconductor films far exceed the solvent resistance of the film containing a monomeric charge transport agent and a separate polymeric binder (No. 3).

EXAMPLE 10

Polymeric photoconductive transport layers were coated from toluene over a non-photoconductor-containing aggregate emitter layer, which was comprised of the dye of Formula 15 (11%), Lexan 145 TM polycarbonate (77%), and a higher molecular weight bisphenol-A-polycarbonate (12%), coated from a 6.7% solids dichloromethane/1,1,2-trichloroethane (70/30) solution with an extrusion hopper. Samples of the resultant photoconductor elements incorporating such charge transport layers were immersed in Isopar G TM for two weeks. The photosensitivity of each immersed sample was then measured for comparison with the photosensitivity of the unimmersed controls. The results were listed in Table IX below, along with the thickness and visible absorption data for the controls.

TABLE IX

| Ex. Number | Polymeric Photoconductor (footnote) | Film Thickness | 400–700 nm λ-max (nm) | D-max | Photosensitivity Control Not Immersed | Immersed |
|---|---|---|---|---|---|---|
| 10.1 | (PE) [1] | 12.0 | 675 | 3.36 | 100 | 91 |
| 10.2 | (PE) [2] | 12.0 | 675 | 3.27 | 74 | 74 |
| 10.3 | (PE) [3] | 11.5 | 675 | 3.25 | 40 | 42 |
| 10.4 | (bPC) [4] | 9.0 | 673 | 3.42 | 73 | 63 |
| 10.5 | (PC) [5] | 12.0 | 676 | 3.29 | 101 | 101 |
| 10.6 | (PC) [6] | 13.0 | 675 | 3.30 | 45 | 37 |

Table IX footnotes
[1] The structure of this Polyester polymer is shown in Formula 16 below.
[2] The structure of this Polyester polymer is shown in Formula 18 below.
[3] The structure of this Polyester polymer is shown in Formula 19 below.
[4] The structure of this block polycarbonate is shown in Formula 20 below.
[5] The structure of this random polycarbonate is shown in Formula 21 below.
[6] The structure of this random polycarbonate is shown in Formula 22 below.

The polyester of Formula 18 is as follows:

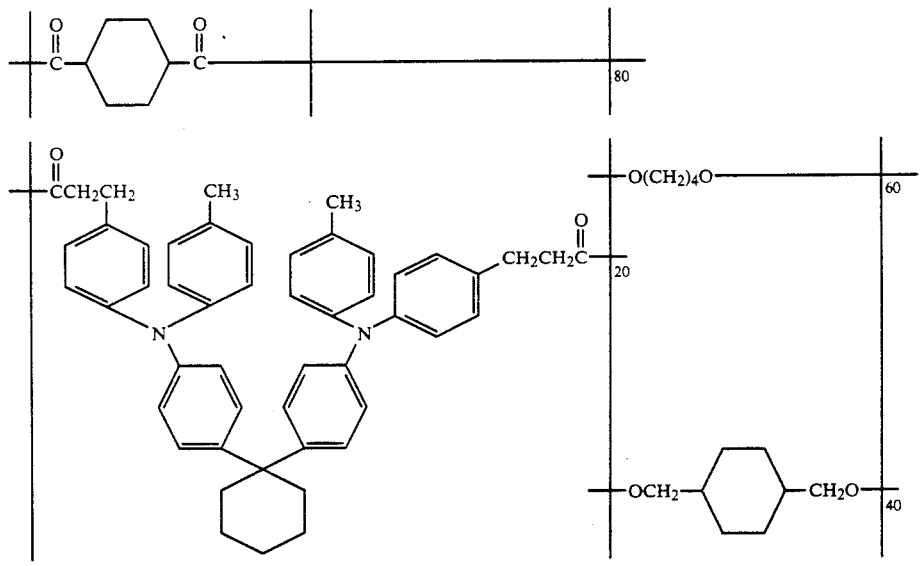

The polyester of Formula 19 is as follows:

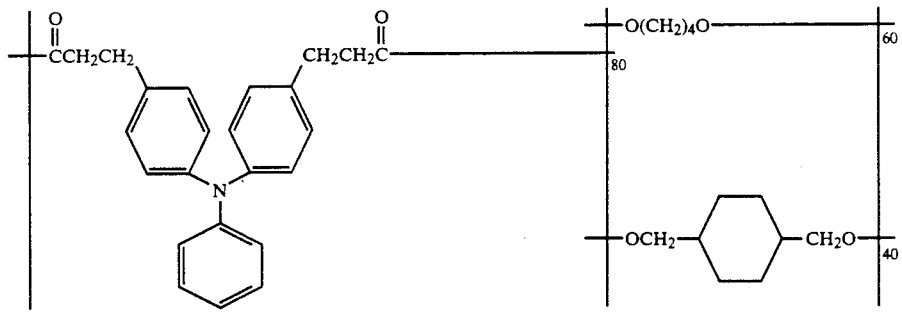

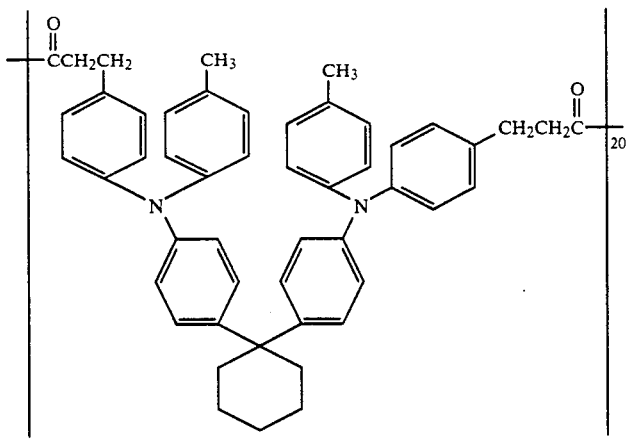
The block polycarbonate of Formula 20 is as follows:
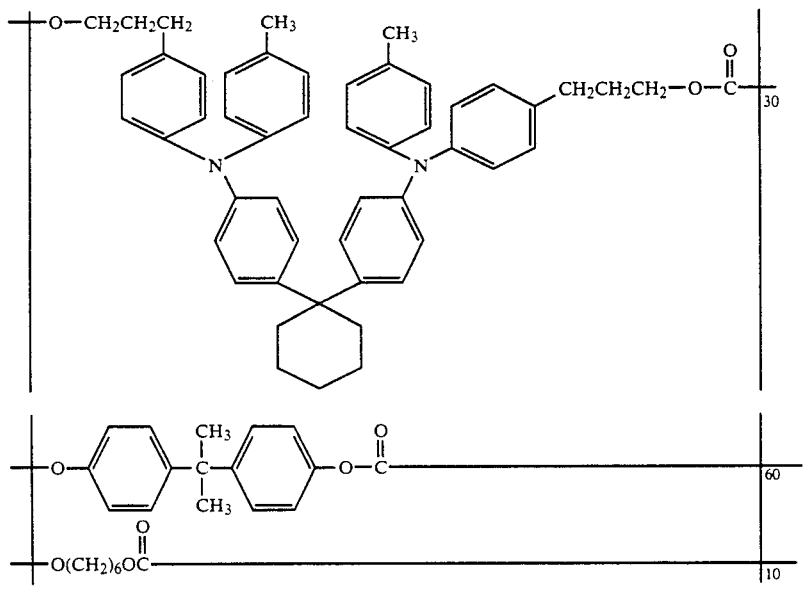
The random polycarbonate of Formula 21 is as follows:
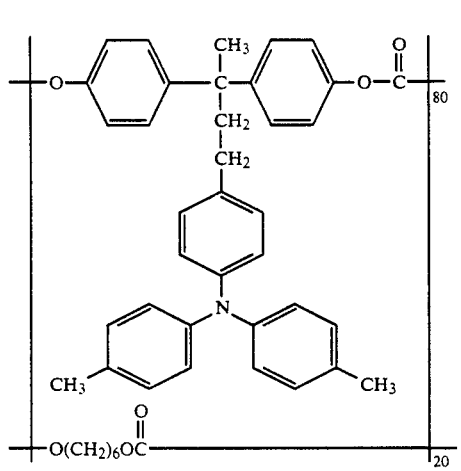
The random polycarbonate of Formula 22 is as follows:
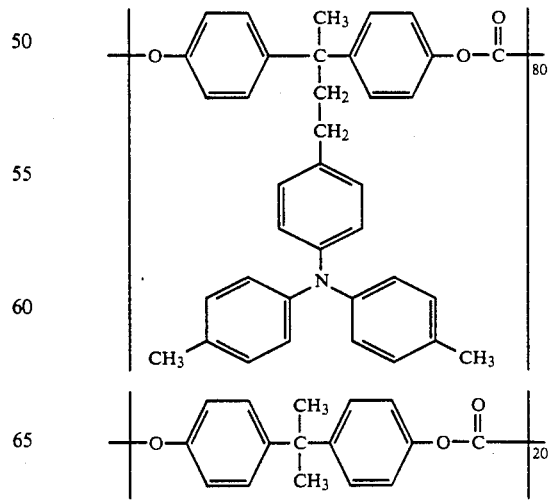

As Table IX shows, the block copolymer of the invention (Ex. 10.4) displayed superior solvent resistance and photosensitivity equal to random photoconductive copolymers.

EXAMPLE 11

Additional photoconductive block polycarbonate copolymers of the invention were made as described in Examples 1 and 2 and then tested as charge transport layers over charge generating layers prepared as described in Example 10. Table X lists identification and results.

TABLE X

| Example No. | Poly OP | 400–700 nm λ-max (nm) | D-max | Photosensitivity |
|---|---|---|---|---|
| 11.1 | (bPC) [1] | 673 | 3.09 | 100[10] |
| 11.2 | (bPC) [2] | 673 | 3.12 | 195 |
| 11.3 | (bPC) [3] | 674 | 2.97 | 368 |
| 11.4 | (PE) [4] | 674 | 3.09 | 278 |
| 11.5 | (bPC) [5] | 672 | 3.05 | 206 |
| 11.6 | (bPC) [6] | 675 | 3.04 | 129 |
| 11.7 | (PE) [7] | 675 | 2.98 | 109 |
| 11.8 | (PE) [8] | 676 | 2.97 | 199 |
| 11.9 | (PE) [9] | 675 | 3.15 | 376 |

Table X footnotes
[1] The structure of this blocked polycarbonate is shown in Formula 12 below.
[2] The structure of this blocked polycarbonate is shown in Formula 10.2 above.
[3] The structure of this blocked polycarbonate is shown in Formula 22 below, with a block ratio = 60/40, not 80/20.
[4] The structure of this polyester is shown in Formula 23 below.
[5] The structure of this blocked polycarbonate is shown in Formula 24 below.
[6] The structure of this blocked polycarbonate is shown in Formula 25 below.
[7] The structure of this polyester is shown in Formula 26 below.
[8] The structure of this polyester is shown in Formula 27 below.
[9] The structure of this polyester is shown in Formula 28 below.
[10] See Table IX, Example 10, same procedure except discharge was from −500 V to −250 V.

The polyester of Formula 23 is shown below:

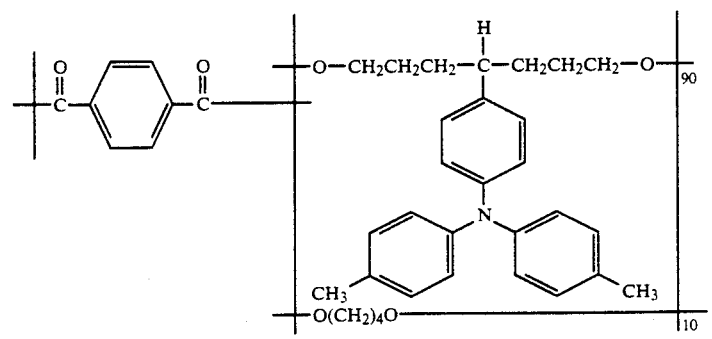

The block polycarbonate of Formula 24 is shown below:

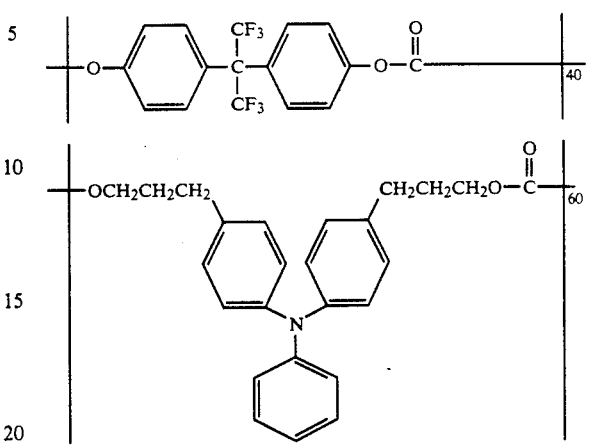

The block carbonate of Formula 25 is shown below:

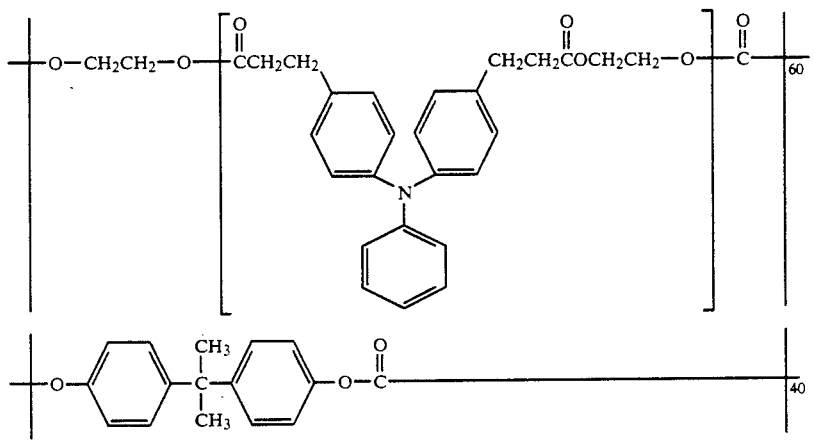

The structure of the polyester of Formula 26 is shown below:

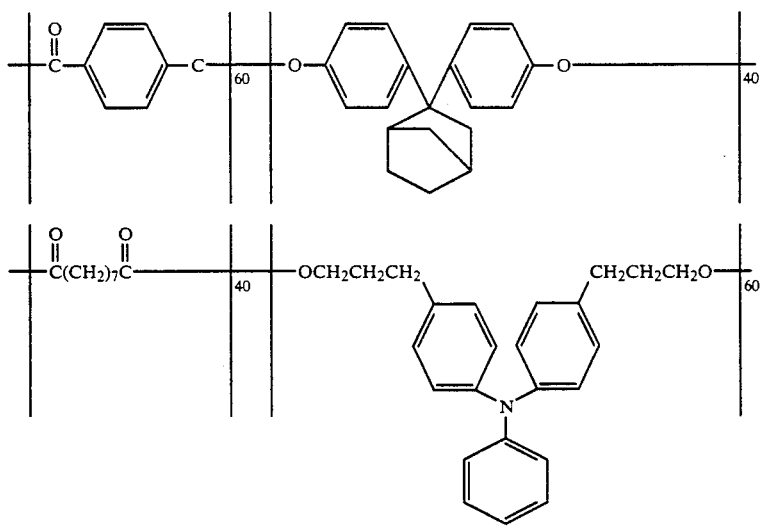
The structure of the polyester of Formula 27 is shown below:
The structure of the polyester of Formula 28 is shown below:
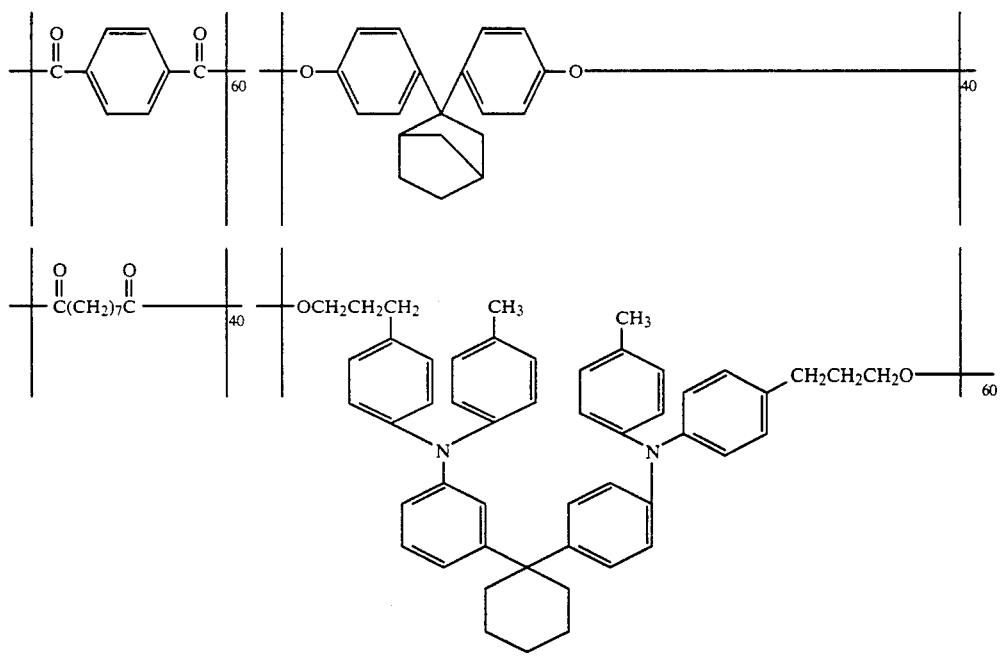
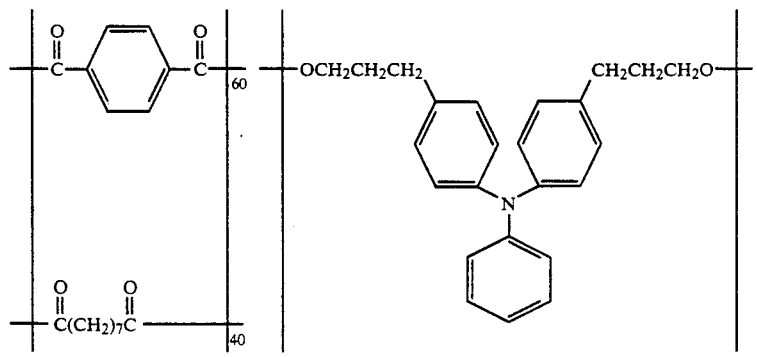

EXAMPLE 12

Charge transport layer (CTL) solutions A, B, C (Table XI) were coated over either (a) the photoconductor-free aggregate charge generating layer (CGL) of Example 10; (b) an aggregate CGL comprised of a photoconductive block copolymer (Formula 9.3) of this invention (97%), the dye Formula 15 (2%), and bisphenol-A-polycarbonate (1%) and coated with an extrusion hopper from a 70/30 (w/w) dichloromethane/1,1,2-trichloroethane solution; or (c) an aggregate CGL essentially as described in U.S. Pat. No. 4,175,960, comprised of monomeric photoconductors Formulae 29 and 30, Lexan 145 ™, and dye Formula 15. The resultant multi-active-layer films were tested as in Example 11. The test results (Table XII) further demonstrate the versatility of the photoconductive block copolymers of this invention in that the copolymers can be used to fabricate useful aggregate charge generating layers.

TABLE XI

| Component | Charge Transport Coating Solutions | | |
|---|---|---|---|
| | A | B | C |
| Photoconductive Random Polyester of Formula 16 | 5.16 g | 5.40 g | |
| Photoconductor of Formula 30 | | | 2.16 g |
| Polyester Binder of Formula 32 | | | 3.24 g |
| Toluene | 20.60 g | | |
| Dichloromethane | | 21.40 g | 21.40 g |
| Methyl acetate | | 9.20 g | 9.20 g |
| DC-510[(1)] | 0.03 g | 0.03 g | 0.03 g |

Table XI Footnotes
[(1)] DC-510 surfactant was purchased from Dow-Corning.

TABLE XII

| Film No. | CTL | CGL | 400–700 nm | | Relative photosensitivity ($-500 \rightarrow 100$ V) |
|---|---|---|---|---|---|
| | | | λ-max (nm) | D-max | |
| 12.1 | A | (b) | 670 | 1.72 | 100 |
| 12.2 | B | (b) | 667 | 1.3 | 36 |
| 12.3 | C | (b) | 667 | 1.3 | 134 |
| 12.4 | A | (a) | 675 | 3.36 | 61 |
| 12.5 | B | (a) | 673 | 3.28 | 37 |
| 12.6 | C | (a) | 675 | 3.33 | 196 |
| 12.7 | A | (c) | 681 | 4.52 | 177 |
| 12.8 | B | (c) | 684 | 4.42 | 132 |
| 12.9 | C | (c) | 685 | 4.61 | 342 |

A, B, C, and (a), (b) and (c) are as described in the text above.

The structure of Formula 29 is as follows:

The structure of Formula 30 is as follows:

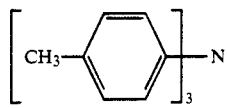

The structure of the photoconductive charge carrier of Formula 31 is as follows:

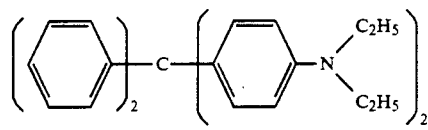

The structure of the polymeric photoconductor of Formula 32 as referenced in Table XI is as follows:

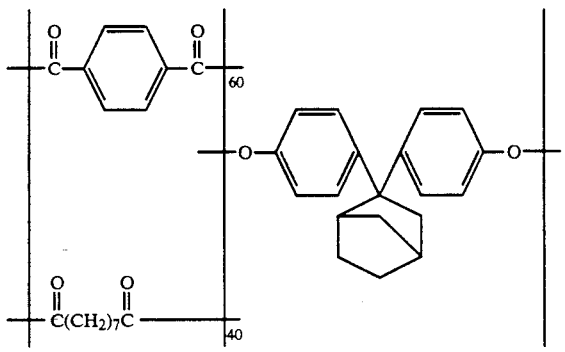

The invention has been described in detail with particular reference to preferred embodiments thereof, but it will be understood that variations and modifications can be effected within the spirit and scope of the invention.

We claim:

1. A photoconductive polycarbonate block copolymer comprising alternating polycarbonate blocks and photoconductive blocks, said photoconductive blocks being selected from the group consisting of polyesters, polycarbonates, and mixtures thereof wherein each photoconductive block contains about 2 to about 25 repeating units of which about 30% to about 100% are residues from reacted photoconductors containing at least two functional groups per molecule.

2. The block copolymer of claim 1 wherein each photoconductive block is a copolymer of a photoconductor having two hydroxyl groups per molecule and phosgene.

3. The block copolymer of claim 1, wherein each of said photoconductive blocks is a copolymer of a photoconductor having two hydroxyl groups per molecule, and a dicarboxylic compound selected from the group consisting of carboxylic acids, carboxylic acid anhydrides, and carboxylic acid esters.

4. The block copolymer of claim 1 wherein each of said photoconductive blocks is a copolymer of a photoconductor having two carboxyl groups per molecule and a copolymerized diol.

5. A reusable photoconductor element comprising in combination successive layers of
   (a) a substrate
   (b) an electrically conductive layer; and
   (c) a photoconductive charge generation layer comprising at least one block copolymer of claim 1 and at least one dye.

6. The photoconductor element of claim 5 wherein a charge barrier layer is positioned between said conductive layer and said photoconductive charge generation layer.

7. The photoconductor element of claim 5 wherein said photoconductive charge generation layer is overcoated with a charge transport layer.

8. The photoconductor element of claim 5 wherein said photoconductive charge generation layer contains a charge transport agent.

9. The photoconductor element of claim 5 wherein said photoconductive layer contains an aggregated dye.

10. The photoconductive element of claim 5 wherein said photoconductive layer contains about 25 to about 90 weight percent on a 100 weight percent total block copolymer basis of residues from at least one incorporated photoconductor.

11. The photoconductor element of claim 5 wherein said block copolymer comprises alternating blocks of polycarbonate and photoconductive polyester copolymer blocks.

12. The photoconductor element of claim 5 wherein said block copolymer comprises alternating blocks of polycarbonate and photoconductive polycarbonate copolymer blocks.

13. A photoconductive polycarbonate block wherein each photoconductive block contains about 2 to about 25 repeating units of which about 30% to about 100% are residues from reacted photoconductors containing at least two functional groups per molecule copolymer comprising alternating polycarbonate blocks and photoconductive blocks, said polycarbonate blocks having polymeric units of the structure:

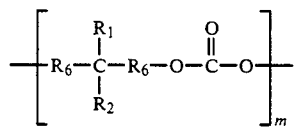

wherein:
$R_1$ and $R_2$ when taken separately can each be a hydrogen atom, an alkyl radical, a substituted alkyl radical, an aryl radical, or a substituted aryl radical;
$R_1$ and $R_2$ when taken together can represent the carbon atoms necessary to form a cyclic hydrocarbon radical containing up to 19 carbon atoms;
$R_6$ is a divalent radical selected from among phenylene radicals, halo substituted phenylene radicals, and lower alkyl substituted phenylene radicals; and
m is an integer of 5 to 40;

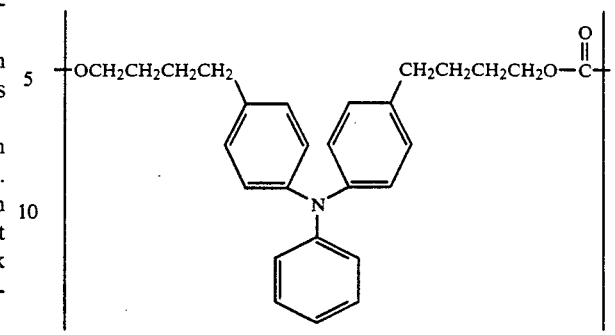

or a polycarbonate block of the formula:

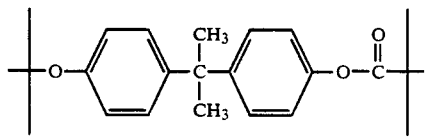

and the photoconductive block is a polyester having polymeric units of the formula:

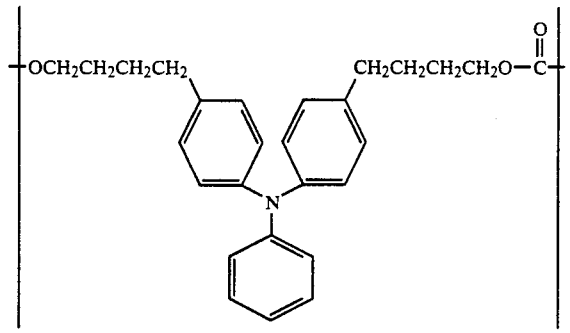

or mixtures thereof.

14. A reusable photoconductor element comprising in combination successive layers of
(a) a substrate
(b) an electrically conductive layer; and
(c) a photoconductive charge generation layer comprising at least one block copolymer of claim 13 and at least one dye.

* * * * *